J. C. BONNELL.

Blank Book.

No. 9,249. Reissued June 15, 1880.

WITNESSES.

James B. Ligius.

R. P. Daggett.

INVENTOR.

John C. Bonnell,

PER

C. Bradford,

ATTORNEY.

UNITED STATES PATENT OFFICE.

JOHN C. BONNELL, OF OMAHA, NEBRASKA.

BLANK-BOOK.

SPECIFICATION forming part of Reissued Letters Patent No. 9,249, dated June 15, 1880.

Original No. 135,760, dated February 11, 1873. Application for reissue filed April 13, 1880.

*To all whom it may concern:*

Be it known that I, JOHN C. BONNELL, of the city of Omaha, in the county of Douglas and State of Nebraska, have invented certain new and useful Improvements in Blank-Books, of which the following is a specification.

The object of my invention is to produce a blank-book having spaces for the names of persons, places, or other general matters to which a large number of other items may have a common relation, on the excess of width of a wide primary sheet, and having spaces for such other items on narrower succeeding sheets, so that the matter on the excess of width on said primary sheet shall bear the same relation to the matter on the succeeding sheets that it does to that on the remainder of its own width, thus avoiding the necessity of repeating such general matters, and also reducing the cost of manufacturing the book.

The invention therefore consists in a blank-book having a primary wide sheet and succeeding narrower sheets, as shown.

It is adapted to many kinds of business, but in the form shown has been particularly intended for the use of railroad agents.

I am aware that books have heretofore been made in which a leaf having an excess of width has been used for a purpose analogous to that herein stated; but such leaves have been in the form of an addition to the regular width, and consequently have been of necessity folded in order to be brought within the covers. As all book-keepers will readily understand, such a construction is entirely unsuitable for the use for which my invention is designed, and I expressly disclaim it, and confine myself to a book in which the widest leaf is no wider than the inclosing-covers.

Figure 1:
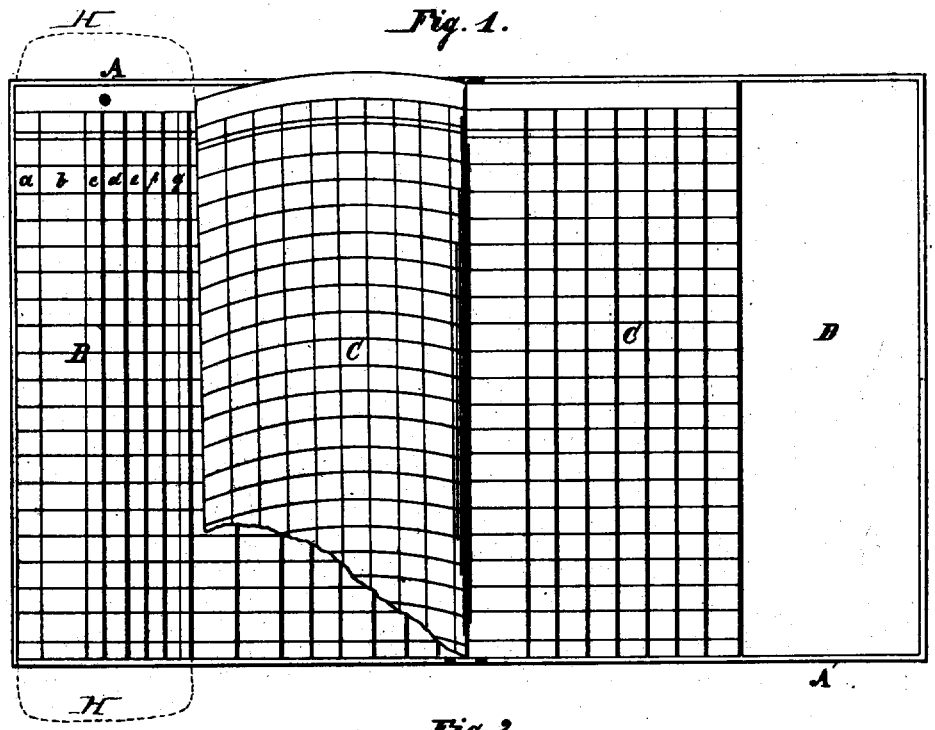
Figure 2:
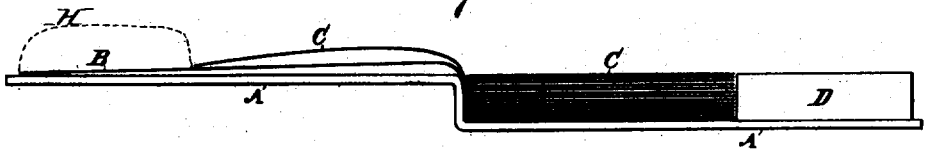
Figure 3:
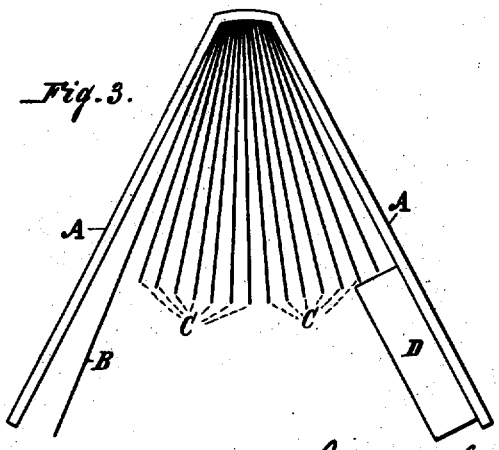

Reference is had to the accompanying drawings, forming a part hereof, of which Figure 1 is a face view of an open book embodying my invention; Fig. 2, a bottom view thereof, and Fig. 3 a top view when the book is partly open only.

In said drawings, the portions marked A represent the covers of the book, B the wide primary sheet, C the narrower succeeding sheets, and D a blocking of paper or other material, which may be used, if desired, to fill out the space in front of the short sheets.

As before stated, this book is particularly intended for the use of railroad agents, and I will now describe the book as manufactured for such use.

Upon the wide sheet B the space marked *a* is for the purpose of entering the name of the office at which the sale is made; *b*, the space in which is entered the name of the buyer; *c*, the space in which the form of coupon is stated; *d*, the space for through rate; *e*, the space for numeral designation of the coupon or coupons; *f*, the space in which is indicated the class to which they belong, and *g* the space in which is placed the pecuniary aggregate to which the sale amounts. These spaces together form a general space, H, which extends from the top to the bottom of the page, and which ordinarily is not repeated anywhere in the book. All the other parts of this sheet and all the space on the succeeding sheets are for the name of the company, under which are rate and amount columns.

As before indicated, the first sheet, B, is made of full size, while the succeeding sheets, C, are each curtailed of paper to the extent of the size of the space H. This lessens the cost of making such a book to a considerable extent, while the name of each buyer, the amount paid by him, and the place of purchase are shown, once for all, upon the same page, and the book has therefore the advantage of superior convenience, as well as a decided economy in the cost of manufacture.

Of course, the plan of forming one general space, H, as has been described, on a wide sheet and of combining the same with narrower succeeding sheets may be applied to books for many purposes without departing from the principle of my invention, and I therefore do not wish to confine myself to any particular arrangement of columns, but expect to vary them as occasion may require.

Having thus fully described my said invention, what I claim as new, and desire to secure by Letters Patent, is—

1. A blank-book in which the first of a series of leaves is of substantially the same width as the covers of the book and the succeeding leaves of the series are narrower than said first leaf, substantially as and for the purposes herein set forth.

2. As a new article of manufacture, a blank-book provided with one full leaf, while the remainder are cut out and the vacant space filled, substantially as and for the purposes herein set forth.

In witness whereof I have hereunto set my hand and seal at Omaha, Nebraska, this 6th day of April, A. D. 1880.

JNO. C. BONNELL. [L. S.]

In presence of—
W. J. C. KENYON,
E. H. ANDRUS.